United States Patent
Hebrard et al.

(10) Patent No.: US 10,831,172 B2
(45) Date of Patent: Nov. 10, 2020

(54) DESIGNING A PART MANUFACTURABLE BY MILLING OPERATIONS

(71) Applicant: DASSAULT SYSTEMES, Velizy Villacoublay (FR)

(72) Inventors: Pascal Hebrard, Velizy Villacoublay (FR); Sebastien Cetre, Aix-en-Provence (FR); Dominique Coz, Aix-en-Provence (FR); Daniel Pyzak, Aix-en-Provence (FR)

(73) Assignee: DASSAULT SYSTEMES, Velizy Villacoublay (FR)

( * ) Notice: Subject to any disclaimer, the term of this patent is extended or adjusted under 35 U.S.C. 154(b) by 103 days.

(21) Appl. No.: 16/272,971

(22) Filed: Feb. 11, 2019

(65) Prior Publication Data

US 2019/0250580 A1 Aug. 15, 2019

(30) Foreign Application Priority Data

Feb. 9, 2018 (EP) ..................... 18305140

(51) Int. Cl.

| | |
|---|---|
| *G05B 19/18* | (2006.01) |
| *G06T 19/20* | (2011.01) |
| *G05B 19/4097* | (2006.01) |
| *G06T 17/10* | (2006.01) |
| *B23C 3/36* | (2006.01) |
| *G05B 19/19* | (2006.01) |
| *G05B 19/4093* | (2006.01) |

(52) U.S. Cl.
CPC .............. *G05B 19/182* (2013.01); *B23C 3/36* (2013.01); *G05B 19/19* (2013.01); *G05B 19/4093* (2013.01); *G05B 19/4097* (2013.01); *G06T 17/10* (2013.01); *G06T 19/20* (2013.01); *G06T 2210/21* (2013.01); *G06T 2219/2021* (2013.01)

(58) Field of Classification Search
CPC ....... G06T 17/10; G06T 19/20; G05B 19/182; G05B 19/19
See application file for complete search history.

(56) References Cited

U.S. PATENT DOCUMENTS

| | | | | |
|---|---|---|---|---|
| 5,506,785 | A | * | 4/1996 | Blank .................... G06T 17/30 345/419 |
| 8,935,138 | B2 | | 1/2015 | Erdim et al. |

(Continued)

FOREIGN PATENT DOCUMENTS

| | | |
|---|---|---|
| EP | 1 677 168 A1 | 7/2006 |
| GB | 2 346 222 A | 8/2000 |

OTHER PUBLICATIONS

Extended Search Report dated Aug. 17, 2018, in European Patent Application No. 18305140.8-1230 (6 pgs.).

*Primary Examiner* — Vincent H Tran
(74) *Attorney, Agent, or Firm* — Oblon, McClelland, Maier & Neustadt, L.L.P.

(57) ABSTRACT

The embodiments relate to a method for designing a part manufacturable by milling operations. The method comprises providing a topologically optimized 3D modeled part, computing a bounding volume encompassing the topologically optimized 3D modeled part, defining a milling direction of a milling tool, computing a silhouette of the topologically optimized 3D modeled part according to the milling direction, the silhouette comprising a contour, and computing a new contour based on a parameter of the milling tool.

16 Claims, 10 Drawing Sheets

(56) References Cited

U.S. PATENT DOCUMENTS

| | | | | |
|---|---|---|---|---|
| 2005/0053275 A1* | 3/2005 | Stokes | ............... | G06T 7/529 |
| | | | | 382/154 |
| 2008/0144903 A1* | 6/2008 | Wang | ............... | G06T 7/12 |
| | | | | 382/130 |
| 2010/0054607 A1* | 3/2010 | Aono | ............... | G06T 19/00 |
| | | | | 382/203 |
| 2018/0348735 A1* | 12/2018 | Atherton | ............... | B25J 9/1679 |

* cited by examiner

DESIGNING A PART MANUFACTURABLE BY MILLING OPERATIONS

CROSS-REFERENCE TO RELATED APPLICATIONS

This application claims priority under 35 U.S.C. § 119 or 365 to European Application No. EP 18305140.8, filed Feb. 9, 2018. The entire contents of the above application(s) are incorporated herein by reference.

FIELD OF THE INVENTION

The invention relates to the field of computer programs and systems, and more specifically to a method, system and program for designing a part compatible with milling operations.

BACKGROUND

A number of systems and programs are offered on the market for the design, the engineering and the manufacturing of objects. CAD is an acronym for Computer-Aided Design, e.g. it relates to software solutions for designing an object. CAE is an acronym for Computer-Aided Engineering, e.g. it relates to software solutions for simulating the physical behavior of a future product. CAM is an acronym for Computer-Aided Manufacturing, e.g. it relates to software solutions for defining manufacturing processes and operations. In such computer-aided design systems, the graphical user interface plays an important role as regards the efficiency of the technique. These techniques may be embedded within Product Lifecycle Management (PLM) systems. PLM refers to a business strategy that helps companies to share product data, apply common processes, and leverage corporate knowledge for the development of products from conception to the end of their life, across the concept of extended enterprise. The PLM solutions provided by Dassault Systemes (under the trademarks CATIA, ENOVIA and DELMIA) provide an Engineering Hub, which organizes product engineering knowledge, a Manufacturing Hub, which manages manufacturing engineering knowledge, and an Enterprise Hub which enables enterprise integrations and connections into both the Engineering and Manufacturing Hubs. All together the system delivers an open object model linking products, processes, resources to enable dynamic, knowledge-based product creation and decision support that drives optimized product definition, manufacturing preparation, production and service.

Topology optimization is a known technique in the field of structural design and is commonly used for optimizing the structural characteristics of a given part. Topological optimization is about finding the optimal part in a given area named design space, with respect to a target. For example, maximization of the stiffness, under some constraints such as limiting the mass.

Thus, topological optimization aids engineers in optimizing the shape of a part which will be submitted to a set of loads, thus having specific structural requirements, while reducing the mass of the part. When a part is used to execute a function, there will be sections which will be subjected to little or no stress during the execution of the function for which it was designed. These sections can be identified via topological optimization methods in order to be removed from the part. Thus, the mass of the part can be reduced without reducing the its durability.

When designing a three-dimensional model of a topologically optimized part, functional specifications are first defined within the design space. Several design concepts for a part can be explored in the design space in order to select the most suited form of the part for a given task. Structural pre-validation steps can also be included during the exploration of design concepts before validating a given shape for a part. The topologically optimized model of a part designed as such, represents a part which can be used to execute the same function as the original part, with similar durability, but which has a smaller weight due to having less mass.

However, topologically optimized models of parts have complex shapes making them hard to manufacture using subtractive manufacturing methods, such as milling. In most cases, a user has to either manually rebuild the model of the part or use additive manufacturing methods to produce the topologically optimized modeled part.

In a first scenario the user will waste time manually modifying the part to make sure that the geometries of the topologically optimized model of the part are accessible to the tool which will be removing material during the manufacturing process. Complex topologically optimized models can have many small holes which all need to be verified and it is easy for the user to overlook or make a mistake in the design. This can potentially lead in the subtractive manufacturing process to the removal of additional material with respect to the topologically optimized model of the part, which can result in the part breaking prematurely.

A second scenario requires manufacturing a part using additive manufacturing, e.g. 3D printing. However, 3D printing is on average less time efficient than milling when manufacturing a part. In addition, the wearing of 3D modeled parts has yet to be fully tested and their use approved in many industrial fields. For example, in the aircraft industry or space industry, it is not possible to use 3D printed parts as there are no certitudes of the reliability of such parts used in long term.

Within this context, there is still a need for an improved method to design a part which can be manufactured using milling operations.

SUMMARY OF THE INVENTION

It is therefore provided a computer-implemented method for designing a part manufacturable by milling operations. The method comprises:
providing a topologically optimized three-dimensional (3D) modeled part;
computing a bounding volume encompassing the topologically optimized 3D modeled part;
defining a milling direction of a milling tool;
computing a silhouette of the topologically optimized 3D modeled part according to the milling direction, the silhouette comprising a contour;
computing a new contour based on a parameter of the milling tool.

The method may comprise one or more of the following:
identifying on the silhouette one or more contours, wherein a contour separates a surface representing a volume occupied by the topologically optimized 3D modeled part and a surface representing an empty volume in the topologically optimized 3D modeled part;
the parameter of the milling tool is a diameter of the milling tool;
computing the set of positions of a circle with a diameter equal to that of the milling tool, the circle being only on the surface of the contour representing an empty volume, for which there is at least one contact point between the circle and the contour and for which no point of the circle is outside the contour;

determining in the set of positions, one or more positions of the circle corresponding to an uninterrupted displacement of the circle along the contour;

with the set of contacts between the contour and the circle in each of the one or more positions determined in the set of positions, computing one or more lines;

identifying the endpoints of the computed one or more lines;

connecting two endpoints with an arc of the circle in contact with the two endpoints, the circle being in one of the one or more positions determined in the set of positions;

computing a polyline following the contour, the polyline being at a maximum distance from the contour determined from a user input and, the polyline being in the surface representing an empty volume;

rounding the convex angles of the segments of the polyline with a curvature equal to that of the circle with a diameter equal to that of the milling tool;

providing a design space from which the topologically optimized 3D object is computed;

identifying on the design space a direction involved by a design intent, the milling direction being the identified direction involved by a design intent;

performing a tessellation of the topologically optimized 3D modeled part, a tile size being limited by the parameter of the milling tool;

projecting the points of the tessellated topologically optimized 3D modeled part on a grid of cells on a plane along the milling direction of the milling tool, a grid cell size being limited by the parameter of the milling tool;

identifying a first group of cells of the grid, the first group of cells each having at least one projected point and having as a neighbor at least one cell with no projected points, the projected points belonging to the cells of the first group defining one or more contours;

identifying a second group of cells of the grid, the second group of cells each having at least one projected point and having neighbor cells with at least one projected point each, at least one of the neighbor cells belonging to the first group of cells;

determining each surface delimited by one or more contours and comprising at least one cell of the second group as a surface representing a volume occupied by the topologically optimized 3D modeled part;

determining each surface delimited by one or more contours and comprising no cell of the second group as a surface representing an empty volume;

computing a 3D volume from the silhouette having the new contour;

selecting one or more further milling directions;

for each further milling direction, computing a silhouette with a respective new contour; and computing the 3D volume from each silhouette computed for each further milling direction.

It is further provided a computer program comprising instructions for performing the method.

It is further provided a computer readable storage medium having recorded thereon the computer program.

It is further provided a system comprising a processor coupled to a memory and a graphical user interface, the memory having recorded thereon the computer program.

It is further provided a method for manufacturing a part by milling operations, comprising providing a milling machine with a part designed according to the above method.

BRIEF DESCRIPTION OF THE DRAWINGS

Embodiments of the invention will now be described, by way of non-limiting example, and in reference to the accompanying drawings, where.

DETAILED DESCRIPTION OF THE INVENTION

Figure 1:
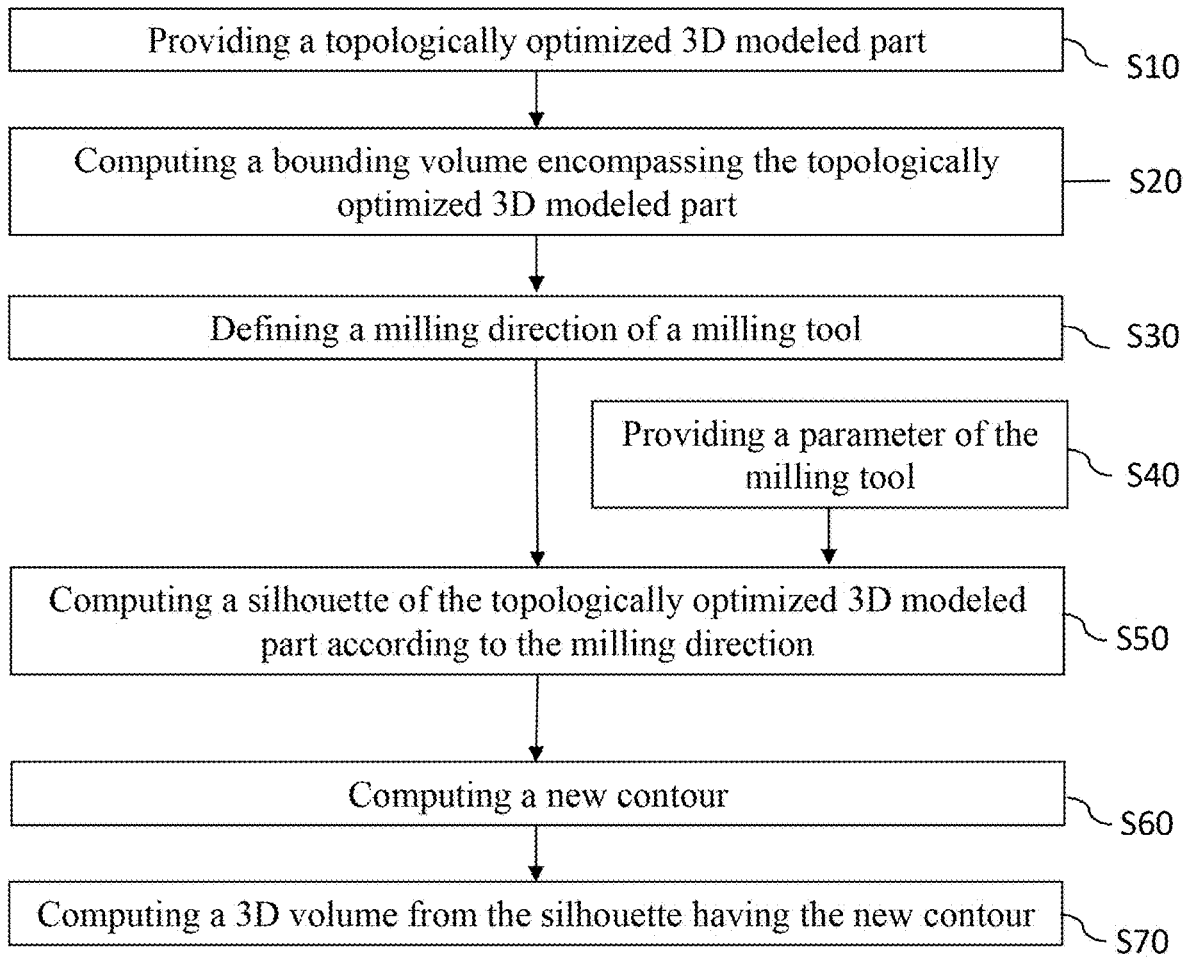
FIGS. 1, 2, 3 and 4 show flowcharts of examples of the method.

With reference to the flowchart of FIG. 1, it is proposed a computer-implemented method for designing a part manufacturable by milling operations. The method comprises, providing a topologically optimized three-dimensional (3D) modeled part. A topologically optimized 3D modeled part is an optimal 3D modeled part which maximizes a performance with respect to constraints. For example, a topologically optimized 3D modeled part may be a 3D model of a part having an optimized material layout within a given design space, for a given set of loads, boundary conditions and constraints with the goal of maximizing the performance of the system. The method further comprises computing a bounding volume encompassing the topologically optimized 3D modeled part. The bounding volume may be an object enveloping on all sides the topologically optimized 3D modeled part, e.g. the bounding volume is a 3D modeled being a parallelepiped. The method also comprises defining a milling direction of a milling tool. The method also comprises computing a silhouette of the topologically optimized 3D modeled part according to the milling direction. The silhouette may be a two-dimensional (2D) projection of the topologically optimized 3D modeled part within the bounding volume on the defined milling direction. The silhouette comprises at least one contour delimiting an outer shape of the projection of the topologically optimized 3D modeled part along the defined milling direction. The method also comprises computing a new contour based on a parameter of the milling tool. The new contour is compatible with milling operations.

Such a method improves the design of 3D modelled parts which have been topologically optimized and which will be manufactured with by milling operations.

Notably, the method removes the need for a user to manually modify a model of a topologically optimized 3D part. The user does no longer need to manually verify if empty volumes, e.g. holes, in the topologically optimized 3D modeled part are large enough to allow their reproduction on a part manufactured using a milling tool. Furthermore, during the machination of the part, the milling tool will reproduce the empty volumes in the part without removing material around said empty volumes; otherwise the topologically optimized part may be weakened and risks breaking prematurely during use.

This is made possible by computing a new silhouette of the part that takes into account of properties of the milling tools that will be used for manufacturing the topologically optimized 3D modeled part; namely, the properties are at least one milling direction and at least one parameter of the milling tool. The silhouette is a projection of the part that shows the outlines of the part to be manufactured; it is a simplified representation of the topologically optimized 3D modeled part which allows computing possible trajectories of the milling tool. The new silhouette comprises at least one new contour that ensures that there is at least one trajectory on the milling block which the milling tool will be able to follow to at the time of producing the part.

The method is computer-implemented. This means that steps (or substantially all the steps) of the method are executed by at least one computer, or any system alike. Thus, steps of the method are performed by the computer, possibly fully automatically, or, semi-automatically. In examples, the triggering of at least some of the steps of the method may be performed through user-computer interaction. The level of user-computer interaction required may depend on the level of automatism foreseen and put in balance with the need to implement user's wishes. In examples, this level may be user-defined and/or pre-defined.

A typical example of computer-implementation of a method is to perform the method with a system adapted for this purpose. The system may comprise a processor coupled to a memory and a graphical user interface (GUI), the memory having recorded thereon a computer program comprising instructions for performing the method. The memory may also store a database. The memory is any hardware adapted for such storage, possibly comprising several physical distinct parts (e.g. one for the program, and possibly one for the database).

The method generally manipulates modeled objects. A modeled object is any object defined by data stored e.g. in the database. By extension, the expression "modeled object" designates the data itself. According to the type of the system, the modeled objects may be defined by different kinds of data. The system may indeed be any combination of a CAD system, a CAE system, a CAM system, a PDM system and/or a PLM system. In those different systems, modeled objects are defined by corresponding data. One may accordingly speak of CAD object, PLM object, PDM object, CAE object, CAM object, CAD data, PLM data, PDM data, CAM data, CAE data. However, these systems are not exclusive one of the other, as a modeled object may be defined by data corresponding to any combination of these systems. A system may thus well be both a CAD and PLM system, as will be apparent from the definitions of such systems provided below.

By CAD system, it is additionally meant any system adapted at least for designing a modeled object on the basis of a graphical representation of the modeled object, such as CATIA. In this case, the data defining a modeled object comprise data allowing the representation of the modeled object. A CAD system may for example provide a representation of CAD modeled objects using edges or lines, in certain cases with faces or surfaces. Lines, edges, or surfaces may be represented in various manners, e.g. non-uniform rational B-splines (NURBS). Specifically, a CAD file contains specifications, from which geometry may be generated, which in turn allows for a representation to be generated. Specifications of a modeled object may be stored in a single CAD file or multiple ones. The typical size of a file representing a modeled object in a CAD system is in the range of one Megabyte per part. And a modeled object may typically be an assembly of thousands of parts.

In the context of CAD, a modeled object may typically be a 3D modeled object, e.g. representing a product such as a part or an assembly of parts, or possibly an assembly of products. By "3D modeled object", it is meant any object which is modeled by data allowing its 3D representation. A 3D representation allows the viewing of the part from all angles. For example, a 3D modeled object, when 3D represented, may be handled and turned around any of its axes, or around any axis in the screen on which the representation is displayed. This notably excludes 2D icons, which are not 3D modeled. The display of a 3D representation facilitates design (i.e. increases the speed at which designers statistically accomplish their task). This speeds up the manufacturing process in the industry, as the design of the products is part of the manufacturing process.

The 3D modeled object may represent the geometry of a product to be manufactured in the real world subsequent to the completion of its virtual design with for instance a CAD software solution or CAD system, such as a (e.g. mechanical) part or assembly of parts (or equivalently an assembly of parts, as the assembly of parts may be seen as a part itself from the point of view of the method, or the method may be applied independently to each part of the assembly), or more generally any rigid body assembly (e.g. a mobile mechanism). A CAD software solution allows the design of products in various and unlimited industrial fields, including: aerospace, architecture, construction, consumer goods, high-tech devices, industrial equipment, transportation, marine, and/or offshore oil/gas production or transportation. The 3D modeled object designed by the method may thus represent an industrial product which may be any mechanical part, such as a part of a terrestrial vehicle (including e.g. car and light truck equipment, racing cars, motorcycles, truck and motor equipment, trucks and buses, trains), a part of an aerial vehicle (including e.g. airframe equipment, aerospace equipment, propulsion equipment, defense products, airline equipment, space equipment), a part of a naval vehicle (including e.g. navy equipment, commercial ships, offshore equipment, yachts and workboats, marine equipment), a general mechanical part (including e.g. industrial manufacturing machinery, heavy mobile machinery or equipment, installed equipment, industrial equipment product, fabricated metal product, tire manufacturing product), an electro-mechanical or electronic part (including e.g. consumer electronics, security and/or control and/or instrumentation products, computing and communication equipment, semi-conductors, medical devices and equipment), a consumer good (including e.g. furniture, home and garden products, leisure goods, fashion products, hard goods retailers' products, soft goods retailers' products), a packaging (including e.g. food and beverage and tobacco, beauty and personal care, household product packaging).

A CAD system may be history-based. In this case, a modeled object is further defined by data comprising a history of geometrical features. A modeled object may indeed be designed by a physical person (i.e. the designer/user) using standard modeling features (e.g. extrude, revolute, cut, and/or round) and/or standard surfacing features (e.g. sweep, blend, loft, fill, deform, and/or smoothing). Many CAD systems supporting such modeling functions are history-based system. This means that the creation history of design features is typically saved through an acyclic data flow linking the said geometrical features together through input and output links. The history based modeling paradigm is well known since the beginning of the 80's. A modeled object is described by two persistent data representations: history and B-rep (i.e. boundary representation). The B-rep is the result of the computations defined in the history. The shape of the part displayed on the screen of the computer when the modeled object is represented is (e.g. a tessellation of) the B-rep. The history of the part is the design intent. Basically, the history gathers the information on the operations which the modeled object has undergone. The B-rep may be saved together with the history, to make it easier to display complex parts. The history may be saved together with the B-rep in order to allow design changes of the part according to the design intent.

By PLM system, it is additionally meant any system adapted for the management of a modeled object representing a physical manufactured product (or product to be manufactured). In a PLM system, a modeled object is thus defined by data suitable for the manufacturing of a physical object. These may typically be dimension values and/or tolerance values. For a correct manufacturing of an object, it is indeed better to have such values.

By CAM solution, it is additionally meant any solution, software of hardware, adapted for managing the manufacturing data of a product. The manufacturing data generally includes data related to the product to manufacture, the manufacturing process and the required resources. A CAM solution is used to plan and optimize the whole manufacturing process of a product. For instance, it can provide the CAM users with information on the feasibility, the duration of a manufacturing process or the number of resources, such as specific robots, that may be used at a specific step of the manufacturing process; and thus allowing decision on management or required investment. CAM is a subsequent process after a CAD process and potential CAE process. Such CAM solutions are provided by Dassault Systemes under the trademark DELMIA®.

By CAE solution, it is additionally meant any solution, software of hardware, adapted for the analysis of the physical behavior of a modeled object. A well-known and widely used CAE technique is the Finite Element Method (FEM) which typically involves a division of a modeled objet into elements which physical behaviors can be computed and simulated through equations. Such CAE solutions are provided by Dassault Systemes under the trademark SIMULIA®. Another growing CAE technique involves the modeling and analysis of complex systems composed of a plurality components from different fields of physics without CAD geometry data. CAE solutions allow the simulation and thus the optimization, the improvement and the validation of products to manufacture. Such CAE solutions are provided by Dassault Systemes under the trademark DYMOLA®.

PDM stands for Product Data Management. By PDM solution, it is meant any solution, software of hardware, adapted for managing all types of data related to a particular product. A PDM solution may be used by all actors involved in the lifecycle of a product: primarily engineers but also including project managers, finance people, sales people and buyers. A PDM solution is generally based on a product-oriented database. It allows the actors to share consistent data on their products and therefore prevents actors from using divergent data. Such PDM solutions are provided by Dassault Systemes under the trademark ENOVIA®.

Figure 13:
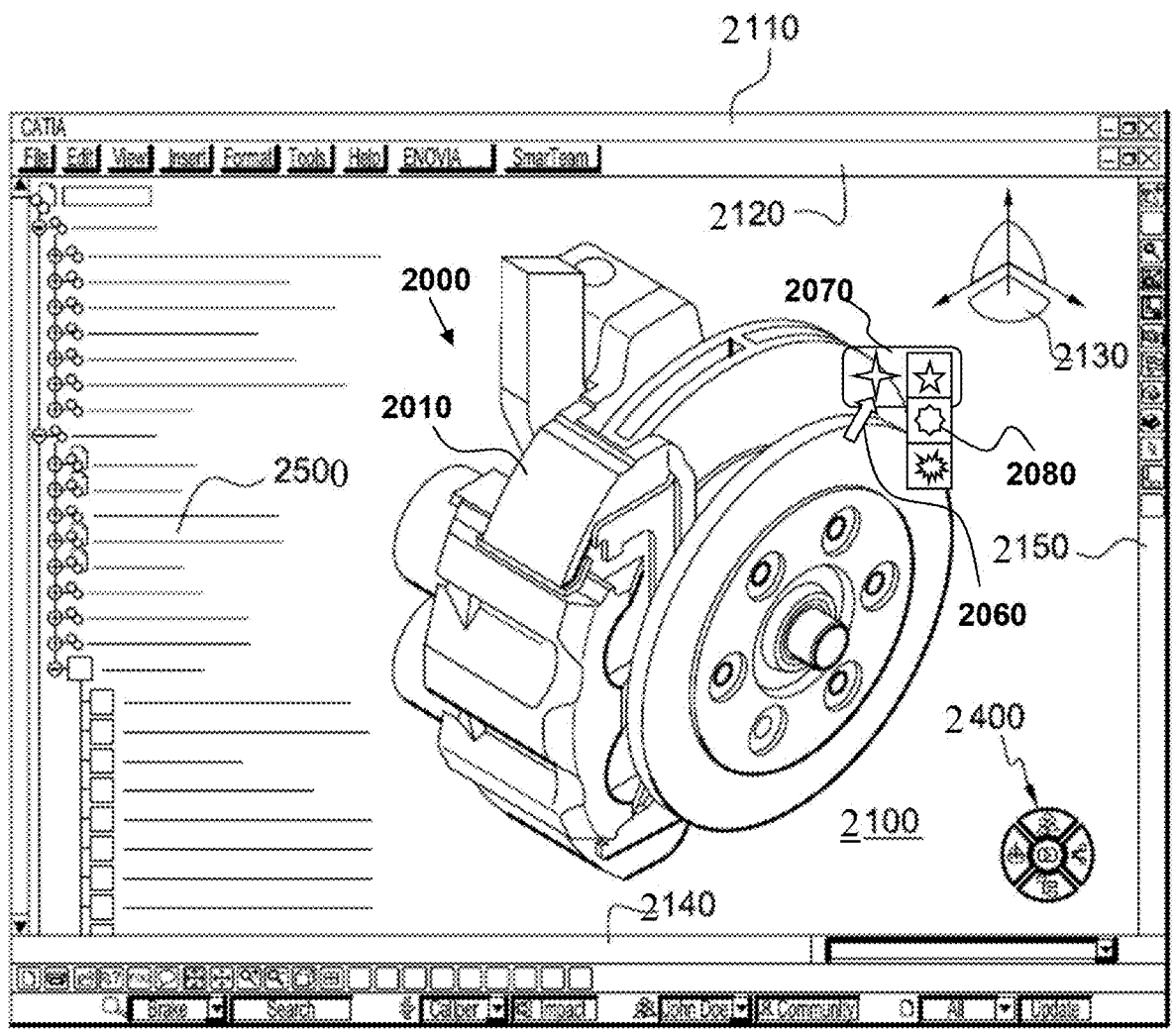
FIG. 13 shows an example of a graphical user interface of a CAD system.

FIG. 13 shows an example of the GUI of the system, wherein the system is a CAD system.

The GUI 2100 may be a typical CAD-like interface, having standard menu bars 2110, 2120, as well as bottom and side toolbars 2140, 2150. Such menu- and toolbars contain a set of user-selectable icons, each icon being associated with one or more operations or functions, as known in the art. Some of these icons are associated with software tools, adapted for editing and/or working on the 3D modeled object 2000 displayed in the GUI 2100. The software tools may be grouped into workbenches. Each workbench comprises a subset of software tools. In particular, one of the workbenches is an edition workbench, suitable for editing geometrical features of the modeled product 2000. In operation, a designer may for example pre-select a part of the object 2000 and then initiate an operation (e.g. change the dimension, color, etc.) or edit geometrical constraints by selecting an appropriate icon. For example, typical CAD operations are the modeling of the punching or the folding of the 3D modeled object displayed on the screen. The GUI may for example display data 2500 related to the displayed product 2000. In the example of the figure, the data 2500, displayed as a "feature tree", and their 3D representation 2000 pertain to a brake assembly including brake caliper and disc. The GUI may further show various types of graphic tools 2130, 2070, 2080 for example for facilitating 3D orientation of the object, for triggering a simulation of an operation of an edited product or render various attributes of the displayed product 2000. A cursor 2060 may be controlled by a haptic device to allow the user to interact with the graphic tools.

Figure 14:
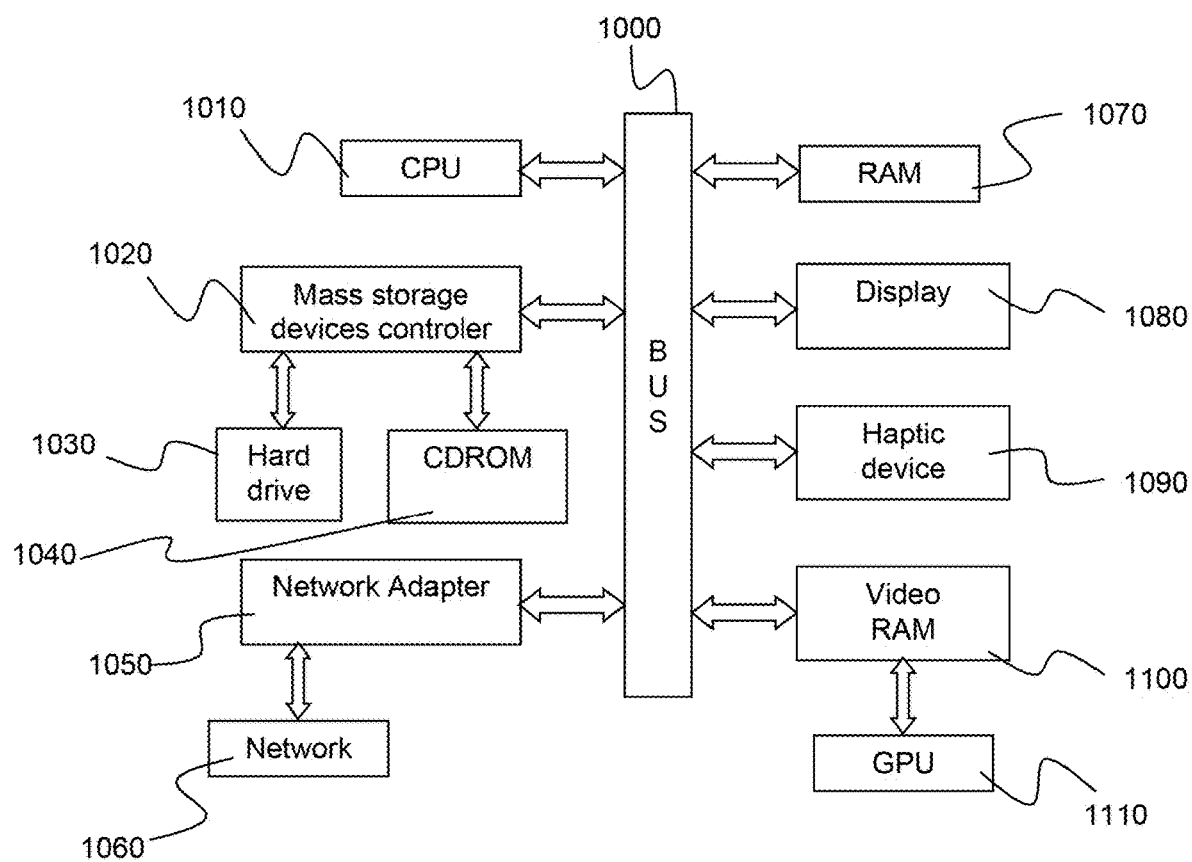
FIG. 14 shows an example of the system.

FIG. 14 shows an example of the system, wherein the system is a client computer system, e.g. a workstation of a user.

The client computer of the example comprises a central processing unit (CPU) 1010 connected to an internal communication BUS 1000, a random access memory (RAM) 1070 also connected to the BUS. The client computer is further provided with a graphical processing unit (GPU) 1110 which is associated with a video random access memory 1100 connected to the BUS. Video RAM 1100 is also known in the art as frame buffer. A mass storage device controller 1020 manages accesses to a mass memory device, such as hard drive 1030. Mass memory devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks; magneto-optical disks; and CD-ROM disks 1040. Any of the foregoing may be supplemented by, or incorporated in, specially designed ASICs (application-specific integrated circuits). A network adapter 1050 manages accesses to a network 1060. The client computer may also include a haptic device 1090 such as cursor control device, a keyboard or the like. A cursor control device is used in the client computer to permit the user to selectively position a cursor at any desired location on display 1080. In addition, the cursor control device allows the user to select various commands, and input control signals. The cursor control device includes a number of signal generation devices for input control signals to system. Typically, a cursor control device may be a mouse, the button of the mouse being used to generate the signals. Alternatively or additionally, the client computer system may comprise a sensitive pad, and/or a sensitive screen.

The computer program may comprise instructions executable by a computer, the instructions comprising means for causing the above system to perform the method. The program may be recordable on any data storage medium, including the memory of the system. The program may for example be implemented in digital electronic circuitry, or in computer hardware, firmware, software, or in combinations of them. The program may be implemented as an apparatus, for example a product tangibly embodied in a machine-readable storage device for execution by a programmable processor. Method steps may be performed by a programmable processor executing a program of instructions to perform functions of the method by operating on input data and generating output. The processor may thus be programmable and coupled to receive data and instructions from, and to transmit data and instructions to, a data storage system, at least one input device, and at least one output device. The application program may be implemented in a high-level procedural or object-oriented programming language, or in assembly or machine language if desired. In any case, the language may be a compiled or interpreted language. The program may be a full installation program or an update program. Application of the program on the system results in any case in instructions for performing the method.

The method may be included in a manufacturing process, which may comprise, after performing the method, producing a physical product corresponding to the topologically optimized 3D modeled part. In any case, the modeled object obtained by the method may represents a part manufactured as a result of milling operations performed on a milling block. The part may thus be a modeled solid (i.e. a modeled object that represents a solid). Because the method improves the design of a part manufacturable by milling operations, the method also improves the manufacturing of a product and thus increases productivity of the manufacturing process.

Referring back to FIG. 1, a topologically optimized 3D modeled part is provided (S10). The topologically optimized 3D modeled part is a 3D modeled part which has undergone a topological optimization process, and at least part of its volume representation results from the topological optimization process. It is to be understood that the complete volume representation can results from the topological optimization process. Topological optimization may be performed as known in the art. The providing in step S10 may result from a designer working on a modeled object; the modeled object may be optimized or not, which involves that the method of the example of FIG. 1 may be carried out on a 3D modeled part or a topologically optimized 3D modeled part. The providing in step S10 may result from the fact that the method may be applied to already existing topologically optimized 3D modeled parts, e.g. retrieved in existing libraries stored on a database. The topologically optimized 3D modeled part may be in the form of a format which uses meshes to represent geometries, such as boundary representation or B-rep. The boundary representation is a widely known format for modeling a 3D object in terms of its envelop (i.e. its outer surfaces). The topologically optimized 3D modeled part represents a part, e.g. a mechanical part which will be manufactured using milling operations.

Next at step S20, a bounding volume encompassing the topologically optimized 3D modeled part is computed. The bounding volume is a 3D modeled object which encloses the topologically optimized 3D modeled part provided at step S10. The bounding volume may be represented on a scene to the user with a transparency level, further showing the topologically optimized 3D modeled part encompassed within. The scene may have a global axis system common to all the 3D modeled objects within the scene. The bounding volume may further represent a bloc of material which will be used for the milling operations; this block of material is also referred to as milling block. The shape of the bounding volume may be any geometrical shape, including but not limited to a parallelepiped, a cube, a sphere, etc. The shape of the bounding volume may be selected by a user or it may be automatically determined. The user may further modify the bounding volume, for example by selecting an offset value to extend the bounding volume on all sides.

"The bounding volume encompasses the topologically optimized 3D modeled part" means that any point that belongs to the part is within the bounding volume; a point of the part may be in contact or not with the bounding volume. The bounding volume may have dimensions such that no point of the part intersects (or is in contact with) the topologically optimized 3D modeled part; usually, the bounding volume represents a milling block which is larger than the part to be manufactured from said milling block.

During the computation of the bounding volume, an orientation of the bounding volume is defined to either reduce the quantity of material required for the machining blank or ease its positioning depending on the milling direction. Depending on the orientation, the bounding volume may need a larger volume to encompass the topologically optimized 3D modeled part. A larger bounding volume may represent a larger milling block during the manufacturing of the part. Thus, a larger quantity of material would be needed to manufacture the topologically optimized 3D modeled part. Hence, a reducing the bounding volume allows for increased efficiency on the quantity of material needed to manufacture a part. The orientation may result from a user selection, or from a global axis system of the scene wherein the topologically optimized 3D modeled part is located, or from an axis system of the topologically optimized 3D modeled part or from a property of the topologically optimized 3D modeled object. The property of the topologically optimized 3D modeled object may be a physical property, for example an inertia matrix of the topologically optimized modeled part computed through a dedicated tool as known in the art. An inertia matrix is a mathematical tool, defined by the moments and products of inertia which are linked to the mass reparation of a part, used to describe the inertia efforts apply to a part. From the inertia matrix it is possible to define an inertia axis system based on the main inertia axes. A bounding box define based on the inertia axis system has in general a smaller volume compared to bounding boxes defined using other axis. The computation of the bounding volume may be performed using other methods which further minimize the volume of the bounding volume.

Next, at step S30, a milling direction of a milling tool is defined for the topologically optimized 3D modeled part.

The milling direction represents the direction of the axis of rotation of a milling tool which may be used to manufacture the part. For example, the milling direction may represent the direction parallel to the rotation axis of a 5 axis or 3 axis milling tool. The milling direction is thus a direction in scene where the topologically optimized 3D modeled part is represented. The milling direction can be defined by the user via a haptic device such as a keyboard, a mouse, a stylus, or the like. Alternatively, a milling direction can be suggested to the user using the design space from which the topologically optimized 3D object is computed. A design space is the allocated volume within which a part is allowed to be when executing a function. It takes into consideration external specification such as avoiding clash with other parts, accessibility, handling or manufacturing constraints. Thus, a milling direction may be suggested by a user by identifying in the design space from which the topologically optimized 3D object is computed a direction involved by a design intent. A design intent can be for example a machining property defined in the design space, the machining property can be related to geometries such as holes, pockets and notches. Alternatively, a milling direction suggested to the user can be computed in order to maximize the material removal during milling operations, or on the contrary to minimize the material removal. Maximizing the material removal allows the part manufactured from the milling operations to be as close as possible of the topologically optimized 3D modeled part.

Figure 5:
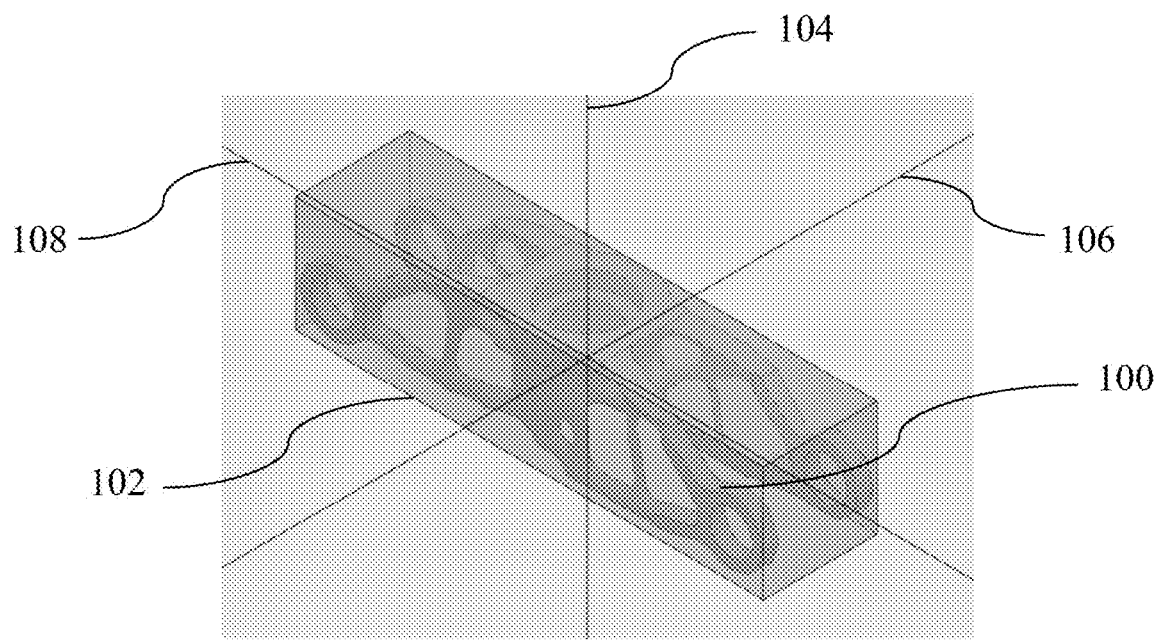
FIG. 5 shows an example of a topologically optimized 3D modeled part encompassed by a bounding volume.

FIG. 5 shows an example of a topologically optimized 3D modeled part (100) inside a bounding volume (102). The Bounding volume, which is a rectangular parallelepiped, has a transparency which enables the user to view the topologically optimized 3D modeled part (100) inside the bounding volume (102). As the bounding volume is a rectangular parallelepiped in this example, it may be also referred to as bounding box. Three milling directions of a milling tool (104, 106 and 108) have been defined and are represented by straight lines going through the center of the topologically optimized 3D modeled part (100). The center of the topologically optimized 3D modeled part may be the barycenter of the part. In another example, the milling directions are centered on the bounding volume. In FIG. 5, the milling direction are perpendicular to three faces of the rectangular parallelepiped. The bounding volume may be adjusted to have the normal vector of one of its faces parallel to a milling direction.

Back to FIG. 1, at step S40, a parameter of the milling tool which will be used to machine the part, is provided. The parameter of the milling tool may be provided upon user action, e.g. selecting via a haptic device such as a keyboard, a mouse, a stylus, or the like, Alternatively, the parameter of the milling tool may be automatically provided, e.g. a default parameter is provided by the system. Providing a parameter may comprise selecting a parameter among a list of parameters, and/or selecting a parameter value. The parameter of the milling tool may be, but is not limited to, the diameter of the milling tool, the type of the milling tool, the model of milling tool, any other parameter that determines a diameter of a milling tool of a milling machine. In examples, the designer selects a value of the diameter of the milling tool, e.g. the user inputs a numerical value of the diameter.

Next, at step S50, a silhouette of the topologically optimized 3D modeled part is computed according to the milling direction. A silhouette is a projection on a plane of the topologically optimized 3D modeled part along the milling direction defined at S30. The plane may be a 2D plane. As an example, the silhouette may be computed by performing a dot product between the normal vectors of the surface of the topologically optimized 3D modeled part and the milling direction, then identifying the points where the dot product changes sign or becomes null and plotting them on a plane normal to a vector having the same direction as the milling direction; by identifying it is meant a computation process which allows one or more points to be known by the computing system.

In examples, the computation of the silhouette comprises identifying on the silhouette one or more contours, wherein a contour of the silhouette separates a surface representing a volume occupied by the topologically optimized 3D modeled part and a surface representing an empty volume in the topologically optimized 3D modeled part. The computed silhouette comprises at least one contour delimiting the outer shape of the projection of the topologically optimized 3D modeled part on the plane. A contour defines a surface by delimiting a closed geometry. By closed geometry it is meant a geometry that can be defined by a set of points, vertices and lines connecting the points in a closed chain, for example a polygon or a circle. In particular, the silhouette of a topologically optimized 3D modeled part may comprise contours delimiting holes in the part, from the point of view of the milling direction. These holes typically represent an absence of material in the modeled part. For example, a circle in the silhouette can represent a through hole in the topologically optimized 3D modeled part. As such, in the silhouette there are one or more contours where each contour separates a surface representing a volume occupied by the topologically optimized 3D modeled part and a surface representing an empty volume in the topologically optimized 3D modeled part. A volume occupied by the topologically optimized 3D modeled part represents a volume physically occupied by the part, or said otherwise, a volume occupied by the topologically optimized 3D modeled part is a volume of the part that is filled with material.

Figure 6:
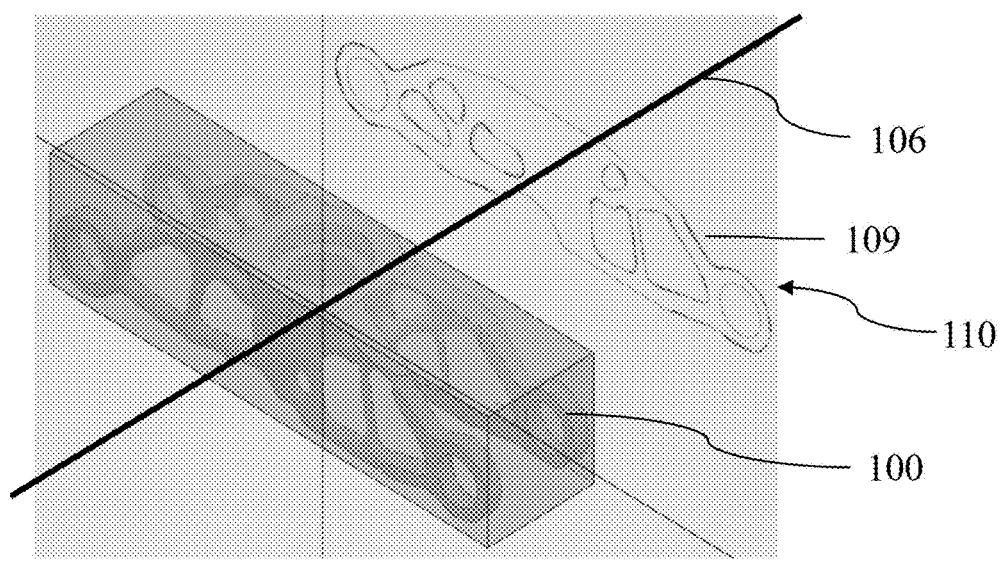
FIG. 6 shows an example of a silhouette of the part of FIG. 5 computed according to a milling direction.

FIG. 6 shows an example of the silhouette (110) of the topologically optimized 3D modeled part 100 from FIG. 5 obtained for the milling direction (106). The silhouette (110) comprises one outer contour (109) delimiting the outline of the shape of the topologically optimized 3D modeled part 100, and comprises eight inner contours representing holes on the topologically optimized 3D modeled part 100. The eight inner contours are contours inside the surface delimited by the outer contour and they delimit surfaces representing an empty volume. It is to be understood that the identification of a contour involves that a surface within the contour is also identified. For instance, the identification of the outer contour 109 amounts to identify the surface 111 enclosed by the outer contour 109. Furthermore, the surface of the (2D) plane on which the silhouette is projected and that is not encompassed by the outer contour is also identified; the entire surface of the (2D) plane on which the silhouette is projected may be limited by the projection of the bounding volume according to the milling direction on said plane.

Figure 2:
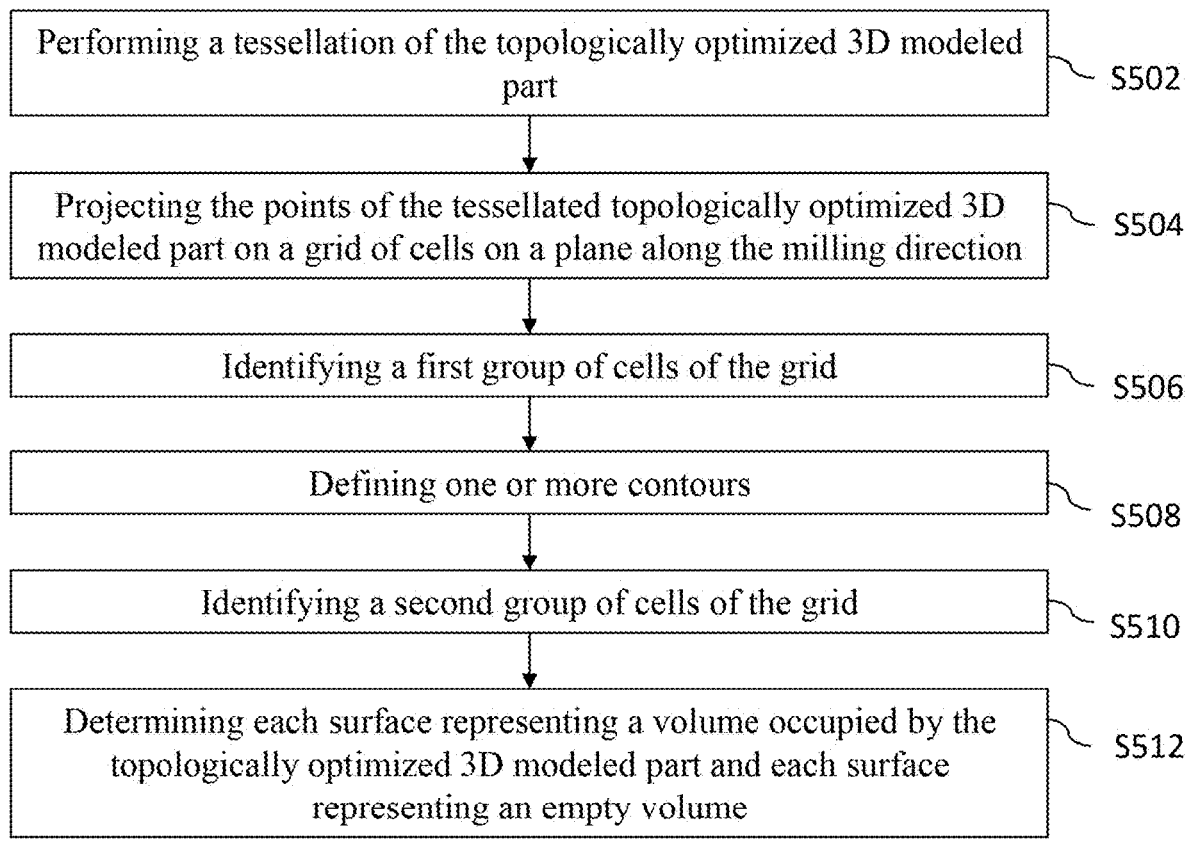

FIG. 2 gives an example of the identification on the silhouette of one or more contours. One reminds that a contour of the silhouette separates a surface representing a volume occupied by the topologically optimized 3D modeled part and a surface representing an empty volume in the topologically optimized 3D modeled part.

First, a tessellation of the surface of the topologically optimized 3D modeled part (5502) is performed. A tessellation is an arrangement of shapes closely fitted together, especially of polygons in a repeated pattern without gaps or overlapping. The pattern of the tessellation are preferably triangles but can be any geometrical shape. Advantageously, having the pattern of the tessellation be triangles optimizes calculations performed using GPUs.

Next, the points of the tessellated topologically optimized 3D modeled part are projected on a grid of cells on a plane along the milling direction (S504). The projected points comprise the vertices of the tessellated topologically optimized 3D modeled part facing the milling direction.

A grid of cells is an arrangement of shapes closely fitted together forming a pattern, a cell being one of such shapes. The size of the grid may be selected by a user or automatically determined, for example by using the bounding volume. The size of the grid is at least sufficient to cover the whole silhouette of the tessellated topologically optimized 3D modeled part. The cells comprising the grid may have any geometrical form, e.g. squares.

Figure 7:
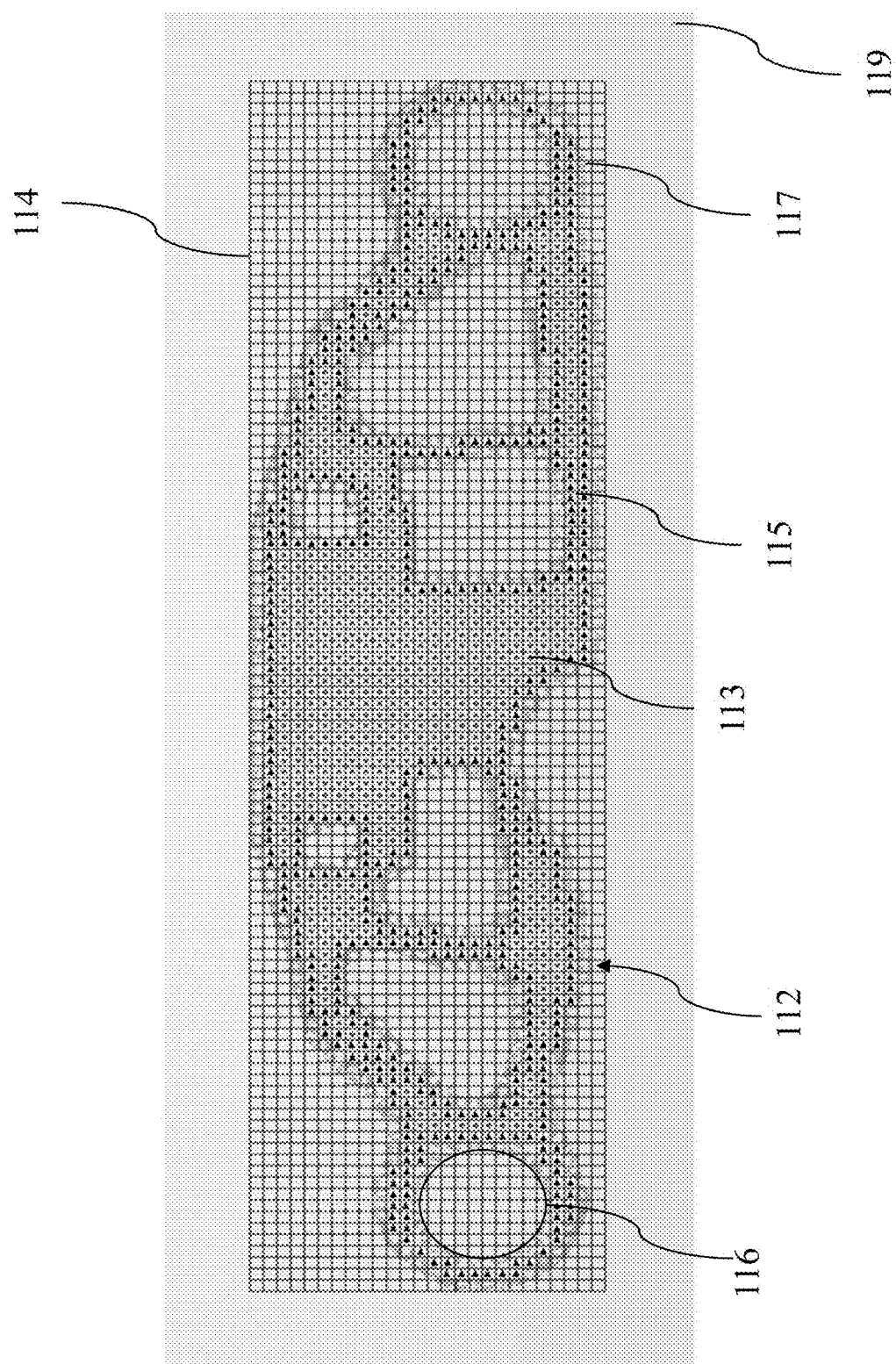
FIG. 7 shows an example of the projection of the tessellated part of FIG. 5 on a grid of cells along a milling direction.

FIG. 7 shows an example of the silhouette (112) of tessellated topologically optimized 3D modeled part 100 of FIG. 5 and FIG. 6. The silhouette 112 is obtained by performing a projection on a grid comprised of cells (114) in the shape of squares. The grid 114 covers the whole silhouette 112 and has a surface of the size of the projection along the milling direction of the bounding box 102 computed in S20.

Back to FIG. 2, a first group of cells may be identified in the grid covering the silhouette. Each cell of the first group of cells comprises at least one projected point and has as a neighbor at least one cell with no projected points (S506). Two cells are neighbors if they share a vertex or a segment. For example, in FIG. 7 a cell can have up to 8 neighbors. A cell comprising a point and having no neighbors with no projected points but being on the edge of the grid, may also be considered as belonging to the first group of cells. A cell comprising a projected point is a cell which encloses a projected point. In the event a point is located on the edge or vertex of two or more cells, said point will be assigned to both cells. The projected points belonging to the cells of the first group define one or more contours (S508).

In FIG. 7, the points 117 of the first group are depicted in blue inside the grid. The points of the first group define for example a circular contour inside the silhouette (116), as well as the contour around the silhouette of the tessellated topologically optimized 3D modeled part among other contours.

The contours of the silhouette can be obtained from the cells of the first group. In a first example, the contours may be computed by computing a line which joins all the points defining the contour, with its starting and ending points being identical, the line may be computed based on an existing geometrical figure such as a square or a circle or a combination of many geometrical figures. The computation of the line may be performed as known in the art.

In a second example, the contours may be computed by identifying one or more surfaces which corresponds to the one or more surfaces delimited by one or more contours represents a volume occupied by the topologically optimized 3D modeled part or a represents an empty volume. In other words, the contours are obtained from the identification of surfaces on the silhouette. This is now explained in reference to steps 510 and 512 of FIG. 2.

At step S510 second group of cells is identified in the grid. Each cell of the second group of cells comprises at least one projected point and has neighbor cells with at least one projected point each. That is, all the neighbor cell comprise at least one projected point. In addition, at least one of the neighbor cells (for each cell of the second group) belongs to the first group of cells (S510). As such, a cell of the second group is next to a cell of the first group. In FIG. 7, cells belonging to the second group are identified by black triangles 115. These cells have at least one cell comprising a blue point as a neighbor.

The determination of the surfaces representing a volume occupied by the topologically optimized 3D modeled part and representing an empty volume may be performed using the first and second group of cells (S512). A first type of surface defined by one or more contours containing within a part of a cell of the second group represents a volume occupied by the topologically optimized 3D modeled part. A second type of surface defined by one or more contours not having any part of the cells from the second group represents an empty volume. For example, in FIG. 7, cells comprising a red dot represent part of the surface occupied by the topologically optimized 3D modeled part. The cells comprising a red dot are within a surface defined by contours defined by blue points 117, such as contour 116. The surface defined by the contours and comprising a cell having a red dot also has cells of the second group; cells having a triangle. For the sake the identifications of dots and points on the FIG. 7, the red dots 113 are those that are centered into cells while the blue points 117 are not restricted to the center of the cell and form clusters; if the FIG. 7 is represented in levels of grey, the red dot are darker that the blue points A contour defines a surface by delimiting a closed geometry. By closed geometry it is meant a geometry that can be defined by a set of points, vertices and lines connecting the points in a closed chain, for example a polygon or a circle, and in which an inner surface and an outer surface can be defined when the geometry is inside a plane. By inner surface, it is meant a surface inside the closed geometry. By outer surface, it is meant the surface outside the closed geometry.

In examples, the shapes forming the tessellation of the topologically optimized 3D modeled part may be computed to be at most the size of the diameter of the milling tool provided in step S40. For instance, the tessellation may be based on triangles that have a circumscribed circle; the diameter of the circle being at most the size of the diameter of the milling tool provided in S40. In addition, the grid of cells may comprise cells for which the maximum distance between two points of two neighboring cells is smaller than the diameter of the milling tool provided at step S40. This ensures that no surface identified as a surface representing an empty volume is created as an artifact of the tessellation. A distance may be an Euclidian distance between two points computed as is known in the art.

Back to FIG. 1, at step S60, a new contour is computed on the silhouette (computed at step S50) based on the parameter of a milling tool provided at S40. The new contour corresponds at least to the outer contour; this is typically the case when there are no inner contours. Additionally, or alternatively, one or more new inner contours may be computed at this step. The new contour(s) may reduce the surfaces representing an empty volume if they have a shape which cannot be reproduced using milling operations. It is to be understood that a surface representing an empty volume may be unmodified if it has a shape which can be reproduced using milling operations.

In examples, computing one or more new contours may comprise removing contours that delimit a surface representing an empty volume is too small to be reproduced using a milling tool. Such a surface may be determined by using a Delaunay triangulation that is computed on the silhouette of the tessellated topologically optimized 3D modeled part. The Delaunay triangulation is computed using only the points inside the cells belonging to the first and second groups determined in S506 and S510 and one or more additional points 119 placed outside the silhouette, on the plane containing the silhouette, and surrounding it. The number of additional points placed outside the silhouette may be four, e.g. the four vertices of the projection of the bounding box 102 on the plane.

After the Delaunay triangulation, three types of triangles can be defined. The first type of triangles comprises the triangles of the tessellated silhouette whose three vertices are projected points comprised in the first group of cells or one of the additional points placed outside the silhouette. A first surface covered by the triangles of the first type is identified as a surface representing an empty volume.

The second type of triangles comprises the triangles whose three vertices are points from the second group of cells. A second surface covered by the triangles of the second type is identified as representing a surface occupied by the topologically optimized 3D modeled part.

The third type of triangles comprises the triangles whose vertices comprise points from the first and the second group of cells. A third surface covered by the triangles of the third type is identified as representing a surface occupied by the topologically optimized 3D modeled part.

Next, for each triangle of the first type, the diameter of the circumscribed circle of the triangle is compared with the diameter of the milling tool provided in S40.

If the diameter of circumscribed circle of a triangle of the first type is smaller than the diameter of the milling tool provided in S40, the triangle is considered as a triangle of the second or third type of triangles. Thus, the surface of the silhouette covered by the triangle now considered as a triangle of the second or third type of triangles, becomes a surface representing a volume occupied by the topologically optimized 3D modeled part.

Next, the edges of the triangles of the second and third type, which are shared with triangles of the first type—that is, common edges between triangles of the second and third types with triangles of the first type—, become one or more new contours on the silhouette and replace previous contour (s). The additional points outside of the silhouette allow triangles of the first type to be computed outside the outer contour of the silhouette. Ensuring that an outer contour of the silhouette is also computed.

The Delaunay triangulation is advantageously performed using a reduced number of points, which minimizes the computation cost of the triangularization.

In examples, the shapes forming the tessellation of the topologically optimized 3D modeled part may be computed to be at most the size of the diameter of the milling tool provided in step S40. This ensures that if a triangle from the Delaunay triangulation has a circumscribed circle with a diameter larger than the diameter of the milling tool and is over a surface representing an empty volume, the milling tool will be able remove the material in order to reproduce the empty volume on the manufactured part.

Figure 3:
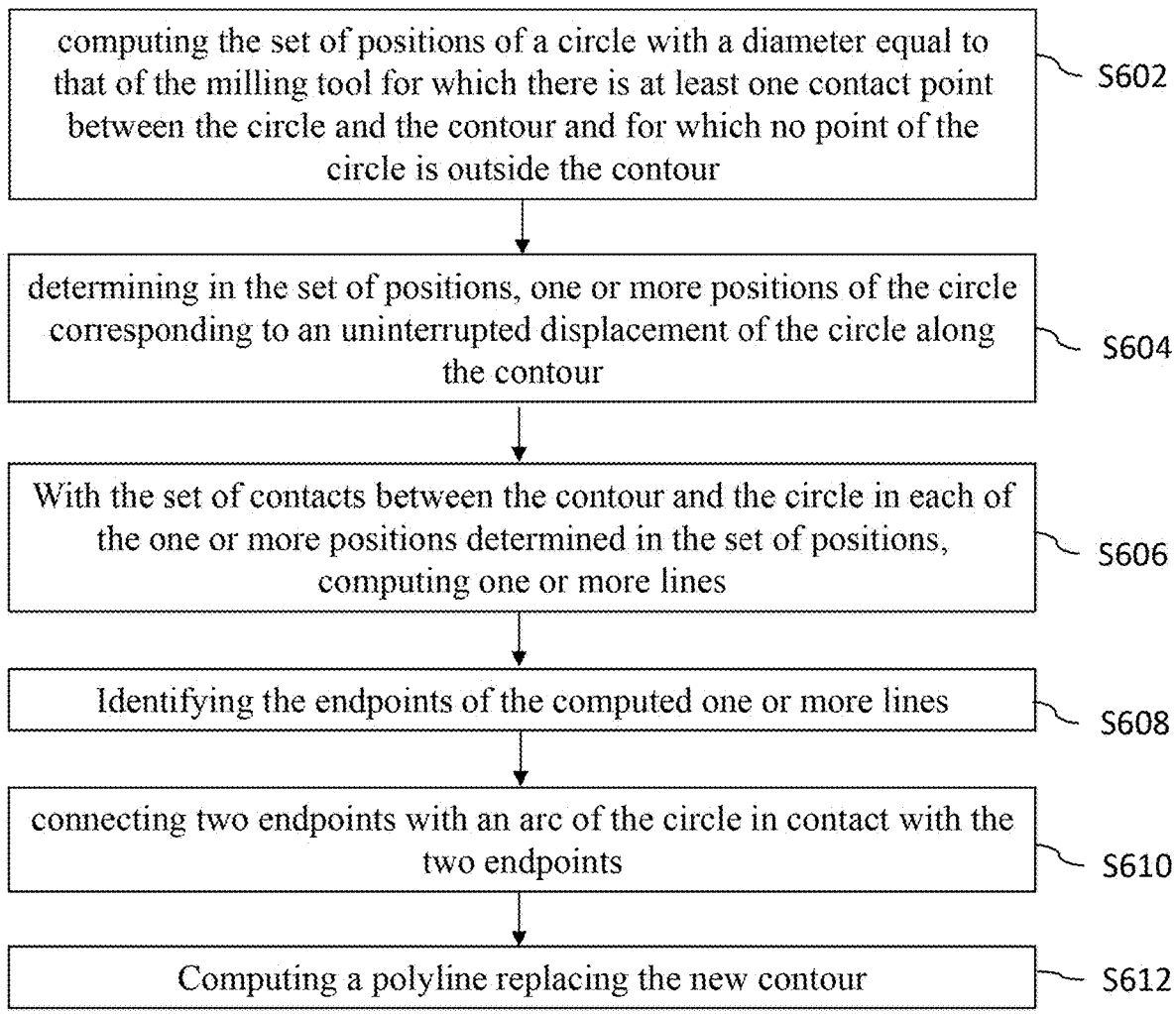

In examples, such as the one illustrated in FIG. 3, the computation of a new contour S60 may include computing a circle (S601) with a diameter equal to the diameter of the milling tool provided at S40. In an example, the diameter of the circle may be slightly larger than the one of the milling tool; for instance, the circle may have a larger diameter within a tolerance range comprised between [0; 25] percent.

For a given contour, a set of positions of the computed circle is determined (S602). For each position of the set of positions, there is at least one contact point between the circle and the contour. For each position of the set of positions, no point of the circle is outside the contour. For each position of the set of positions, the circle is inside a surface representing an empty volume. The computed set of positions represent locations for which the milling tool will remove material at the time of manufacturing the part.

In examples, the positions of the circle corresponding to an uninterrupted displacement of the circle along the contour may be determined (S604). These positions are determined from the set of position computed at step S602. The uninterrupted displacement of the circle follows a closed trajectory inside the surface representing an empty volume, with the circle always being in contact with the contour. As the displacement of the circle follows a closed trajectory, the first and last positions of the circle coincide with one another. Hence, the set of positions corresponding to an uninterrupted displacement of the circle along the contour represents the boundary of the contour which can be milled without changing the structure of the topologically optimized 3D modeled part.

The positions of the circle corresponding to an uninterrupted displacement around the contour may be stored as the trajectory of the center of the circle in the surface representing an empty volume. The trajectory of the center of the circle may be the extreme trajectory of the milling tool during the machining.

The points of contact between the circle and the contour obtained for each of the determined positions (S604), form a set of points of contact. With the set of points of contact, one or more lines may be computed (S606). As the determined set of positions of the circle corresponds to an uninterrupted displacement of the circle along the contour, the points belonging to the set of points of contact can be grouped into one or more lines defining at least one part of the new contour. A line groups an uninterrupted succession of points of contact between the circle and contour. The uninterrupted succession of points of contact grouped by a line overlap with points of the contour which are successive; successive meaning two points located one after the other when following the contour. It is to be understood that a line might comprise one point, for instance when the contour comprises sharp and narrow edges.

Figure 8:
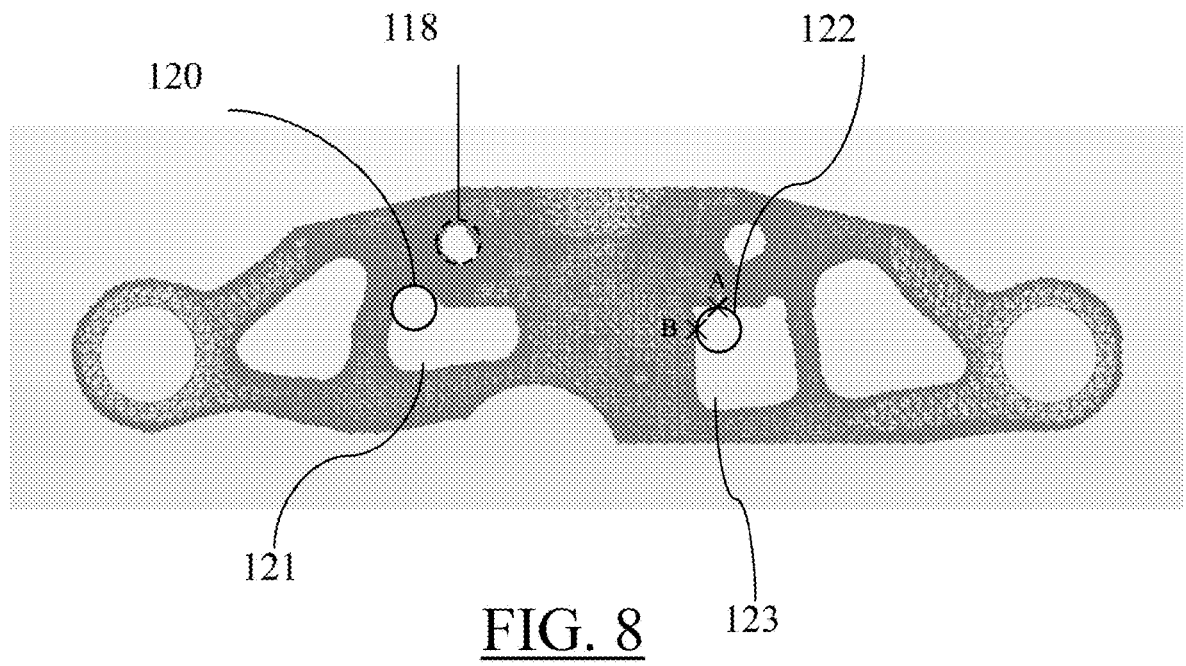
FIG. 8 shows examples of operations of computing a new contour of the tessellated silhouette of FIG. 6.

FIG. 8 shows an example of a tessellated silhouette of the topologically optimized 3D modeled part shown in FIG. 5 and FIG. 6, illustrating different situations during the computation of a new contour in step S60, in the example where a circle is computed in step S601. The dark areas on FIG. 8 represent a volume occupied by the topologically optimized 3D modeled part, while the light-colored areas represent an empty volume. In position 118 of the circle represented in a dashed line, the surface representing an empty volume is smaller than the surface covered by the circle computed in step S601; the contour which delimited said surface will be removed and the surface will be identified as a surface representing a volume occupied by the topologically optimized 3D modeled part. The position of the circle 120 on the contour 121 corresponds to one of the determined positions of step S604. The points of contact of the contour 121 with the circle 120 are numerous as the curvature of the contour is the same as that of the circle. The multiple points of contact in position 120 between the circle and the contour are uninterrupted and will be in the same line during step S606: indeed, the points of contacts overlap successive points of the contour. The position of the circle 122 also corresponds to one of the determined positions of step S604. There are two distinct points of contact between the circle and the contour, points A and B. These two points are not in an uninterrupted succession and will belong to two different lines during step S606.

Back to FIG. 3, it is now discussed an example of computing a complete contour from the lines obtained as a result of steps S601 to S606. Indeed, situations may occur where the minimum curvature of the contour is smaller than the curvature of the circle computed in step S601. This situation is illustrated on FIG. 8 with the circle 122.

At step S608, the endpoints of the computed one or more lines are identified. An endpoint of a line is one of the two points of the line that mark the ends of the line.

Then, at step S610, one or more lines defining at least one part of the new contour are connected, if necessary. That is, the two endpoints of a given line do not coincide, a first endpoint of a line is connected to a second endpoint. The second endpoint is the closest endpoint to the first endpoint. The first and second endpoint may belong to the same line, for instance when there is only one line defining one part of the new contour. The first and second endpoint may belong to different lines, for instance when there is more than one line defining part of the new contour.

The connection between the first and second endpoint is made using an arc of the circle computed in step S601, the circle being in a position corresponding to a position determined in step S604 in which the first and second endpoints are points of contact between the circle and the contour. The connected line is a contour inside a surface representing an empty volume. The arcs connecting the endpoints are those which maximize the inner surface of the connected line.

Connecting two endpoints is repeated until all endpoints are connected.

The one or more connected line(s) replace may replace the contour used during the steps S602-S606; they form the new contour. The surface between the contour to be replaced and the connected line becomes a surface representing a volume occupied by the topologically optimized 3D modeled part, while the rest of the surface representing an empty volume is unchanged. Steps 602-610 are repeated for each contour of the silhouette.

As a result of step S610, only the connected lines are retained as new contours for the silhouette. As explained in reference to FIG. 8, a surface representing an empty volume which is smaller than the circle computed in 5601 will no longer be delimited by a contour and will be defined as a surface representing a volume occupied by the topologically optimized 3D modeled part. Thus, the surfaces representing an empty volume, which are too small for the milling tool to perform milling operations on them, are removed. This allows to remove from the 3D model of a topologically optimized part any hole which has a surface smaller than the size of a milling tool without the user having to look for or select the holes.

In addition, all the surfaces delimited by the new contours represent volumes which can be reproduced through milling operations. For each surface representing an empty volume, there is at least one trajectory inside the surface which a milling tool can follow without crossing the contour. This enables the milling tool to reproduce the empty volume in the manufactured part as it is represented in the silhouette. The new contours being computed on a surface representing an empty volume ensures that during milling operations all the volume occupied by the original topologically modified 3D modeled part will also be occupied by the manufactured part.

In addition, the new contours are computed using a circle with a diameter equal to the diameter of the milling tool provided at S40. Thus, the shape of the contours take into account the circular cutting motion of a milling tool. The contours may delimit a surface representing an empty volume; in other words, a volume to be removed when manufacturing the part. Thus, the computation of the new contours also result in a more realistic design of a part manufacturable using milling operations.

It is to be understood that in the previous example steps S601-S610 are presented in succession for a given contour for the sake of clarity. The steps may be executed in succession or simultaneously for multiple contours.

Figure 9:
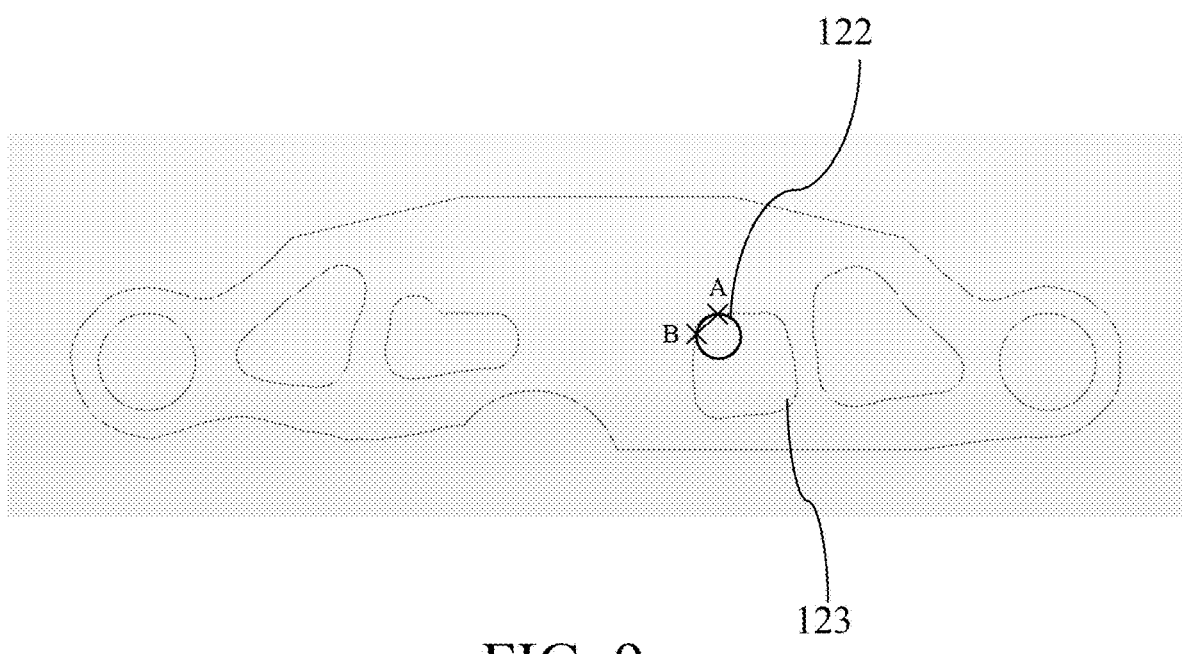
FIG. 9 shows an example of the silhouette of FIG. 8 with new contours compatible with milling operations.

FIG. 9 shows an example of the silhouette from FIG. 8 having new contours computed according to steps S601-S610. The circle 122 of FIG. 8 is also represented on FIG. 9, with a same position. The new contour 123 has the same curvature as the arc of the circle 122 between points of contact A and B; A and B are in this example endpoint of two different lines. The surface representing an empty volume in position 118 in FIG. 8 is also removed in FIG. 9.

Back to FIG. 3, at step S612, a polyline may be computed for one or connected lines. The one or more computed polylines will become the new contours of the silhouette.

The computation of a polyline may be computed by following one or more contours on the silhouette. For example, the polyline may follow one or more connected lines computed at step 610. The polyline is computed over a surface representing an empty volume. This allows preserving the surface representing a volume occupied by the topologically optimized 3D modeled part.

A polyline is a continuous line composed of one or more line segments. The computed polyline follows the connected line(s). The computation of the polylines is performed as known in the art.

Figure 4:
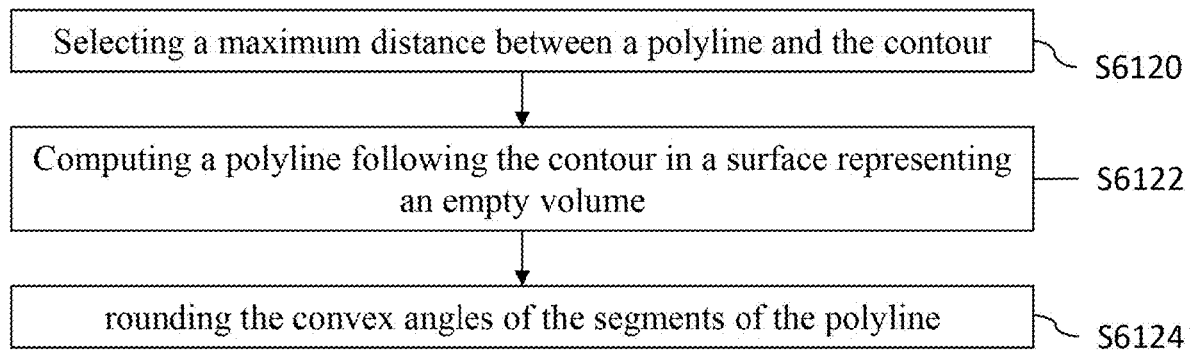

Referring now to FIG. 4, it is discussed an example of computation of the polyline.

At step S6120, the user selects a maximum distance between a polyline and the contour. The selection may be done by receiving a user specification of the distance, or by selecting a predefined distance in a menu. For any point in the polyline to be computed, there must be at least one point in the contour, for example a point in a connected line, which is at a distance smaller than the maximum distance selected by the user. The polyline is computed as known in the art, for example but not limited to using Douglas-Peucker algorithm. The polyline allows the milling tool, when manufacturing the part, to change directions a limited number of times, facilitating the manufacturing of the part.

This allows the user to select a maximum distance between a polyline and a contour depending on his needs. A short maximum distance will result in a polyline formed by many segments, each segment representing a change of direction of a milling tool during the manufacture of the part. With many segments the milling tool will be able to more accurately reproduce the shape of the part during the manufacturing process. On the other hand, a longer maximum distance will result in a polyline formed by less segments. The milling tool will require less direction changes during the manufacturing of the part, which will increase the speed at which the part is manufactured by the milling machine.

After the selection of the maximum distance, the polyline is computed in a surface representing an empty volume, at step S6122.

Then, at step S6124, the convex angles of the segments of the polyline are rounded. The polyline defines a geometry which may comprise one or more internal convex angles. An internal convex angle is an angle of a surface delimited by the polyline having an angle lower than 180°. These convex angles are rounded using the curvature of the circle computed in S601 to give the polyline a shape compatible with the milling tool. It is to be understood that the polyline computed after rounding the angles does not overlap with a portion of a surface a volume occupied by the topologically optimized 3D modeled part.

Back to FIG. 1, a 3D volume may be computed from the silhouette having the new contour (S70). For instance, the 3D volume may be computed after the computation of a new contour obtained as a result steps S610 or S612.

In examples, the 3D volume may be computed from more than one silhouette having a new contour. This allows to manufacture a more accurate representation of the topologically optimized 3D modeled part. In an example, this is performed by using the bounding volume and one or more silhouettes having the new contour computed from different milling directions. The 3D volume is typically a representation of the topologically optimized part compatible with milling operations. Compatible with milling operations means that the part can be manufactured for a given parameter of the milling tool, e.g. a diameter of the milling, using milling operations. A milling operation may comprise a milling direction.

Figure 10:
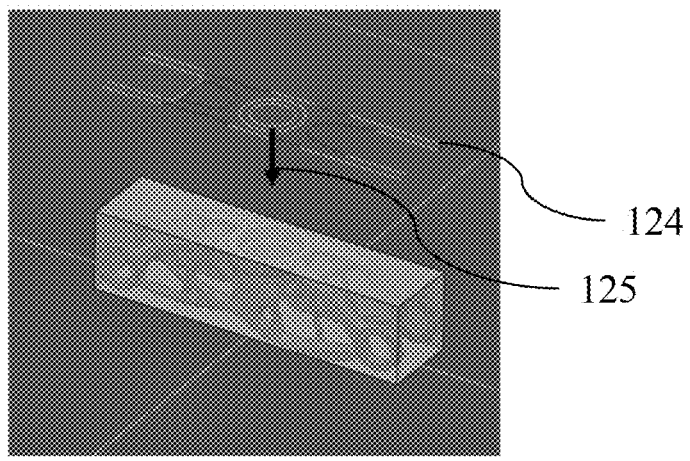
FIG. 10 shows an example of another silhouette of FIG. 5 aligned with a bounding volume representing a milling block.

FIG. 10 shows an example a silhouette (124) computed after steps S610 or S612 using the milling direction 104 shown in FIG. 5. This silhouette comprises at least one new contour. The bounding volume of FIG. 5 and FIG. 6, enclosing the topologically optimized 3D modeled part, is also represented. The silhouette 124 is aligned with the bounding volume according to the milling direction which was used to compute the silhouette 124. The direction is represented by the arrow 125 in FIG. 10. The alignment is identical to the one used for computing the silhouette (S50), in other words the relative position between the silhouette and the bounding volume is the same as the one in step S50.

After the alignment, the volume of the bounding volume aligned with a surface representing an empty volume of the silhouette is removed. The removed volume corresponds to an extrusion of the surface representing an empty volume of the silhouette, on the bounding volume, using the milling direction. Before storing the 3D volume in memory, a preview of the resulting 3D volume may be presented to the user, along with the corresponding silhouette as shown in FIG. 11.

Figure 11:
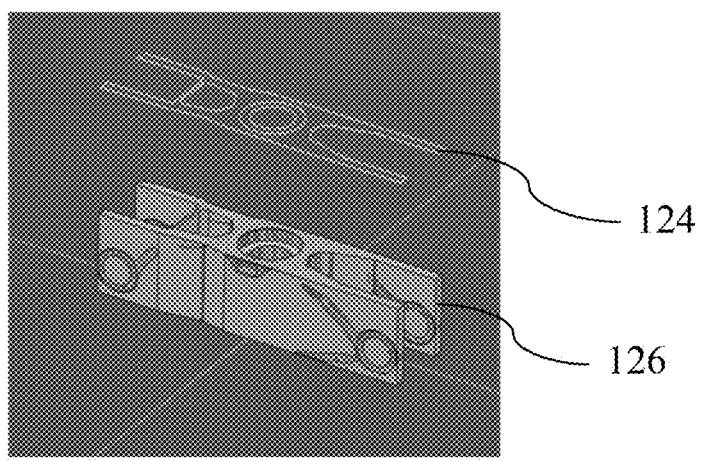
FIG. 11 shows an example of a 3D volume computed from the silhouette of FIG. 10.

FIG. 11 shows an example of a preview of a 3D volume (126) computed from the silhouette 124. In FIG. 11 the bounding volume is modified by removing the volume aligned with the surfaces representing an empty volume in the silhouette 124 according to the milling direction 125. The volume of the bounding volume aligned with the surface of the plane surrounding the outer contour of the silhouette 124 is also removed. The removed volume corresponds to an extrusion of the surface representing an empty volume of the silhouette, on the bounding volume, using the milling direction.

Further milling directions may be defined in S30 and the corresponding new silhouettes computed following steps S40-S60. A new silhouette is a silhouette with at least one new contour. The new silhouettes can then be used to compute a 3D volume. For example, the new silhouettes can be used to modify the 3D volume 126 of FIG. 11. The new silhouettes may be aligned with the 3D volume according to the respective milling direction of each silhouette. Then, the volume of the 3D volume aligned with a surface, of any silhouette, representing an empty volume is removed.

The computation of the 3D volume using two or more the new silhouettes may be performed sequentially for each new silhouette, or simultaneously using all the silhouettes available.

Figure 12:
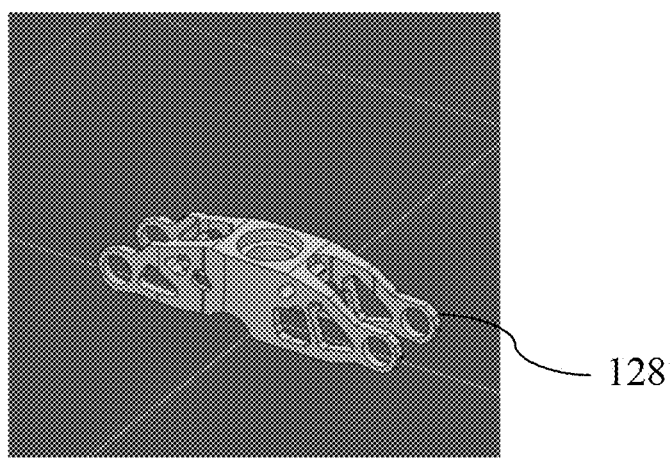
FIG. 12 shows an example of a 3D volume computed from multiple silhouettes, including the silhouette of FIG. 11.

FIG. 12 shows an example of the 3D volume (128) computed from the 3 silhouettes corresponding to the milling directions 104, 106 and 108 shown in FIG. 5. The 3D volume represents the topologically optimized part (S10) which is compatible with milling operations and can be manufactured using a milling tool. The surface of the volumes are larger or equal to the diameter of the milling tool and there is always at least one path the milling tool can follow to remove the volume during a milling operation, reproducing the computed 3D volume.

The volume removed during the computation of the 3D volume is always equal to or less than a corresponding empty volume of the topologically optimized 3D modeled part provided in step S10. The one or more new contours computed in S60 are always computed over a surface representing an empty volume. As such, a part manufactured through milling operations which reproduces the computed 3D volume should have a robustness at least equal to the expected robustness of the topological optimized 3D modeled part provided in step S10.

One or more of steps S10-S70 may be executed using a graphical interface (GUI) as the one illustrated on FIG. 13, which includes tools to assist during the execution of the described method. For example, during S40, the parameter of a milling tool may be provided through a dialogue box. As another example, the topologically optimized three-dimensional (3D) modeled part may be selected by the user through the GUI. A preview of the computation of a silhouette according to a milling direction or of the 3D volume computed from a silhouette may also be provided at the corresponding step of the method. Advantageously, the user may go back to a previous step by navigating using a graphic toolbox if he is not satisfied with the 3D volume obtained with a given silhouette.

The part designed according to one or more of the examples of the method can be manufactured by a milling machine. A milling machine is a machine tool that that can carry out milling operation. The milling operations (also referred to as milling functions) may be but not limited to face milling, shoulder milling, tapping, drilling, . . . Milling operation may be performed about 3 to 6 axes. The milling machine is provided with the design of a part obtained with the method of the invention, and then the milling machine translates the provided designed part into manufacturing directives. The manufacturing directives may be computed by a CAM software. The directive are then transformed into commands that are in general specific to a particular milling machine model. Hence, the series of milling operation needed to produce the part is highly automated and closely matches the designed part.

The bounding volume represents the milling block, which is the bloc of material on which milling operation remove material for manufacturing the part. As such, the bounding volume represents the volume of the unmachined raw material which is transformed into the designed part as a result of the milling operations. In practice, the milling block is a regular parallelepiped.

The one or more milling directions (S30) may be determined according to the machining constraints of the milling machine. For instance, a 3-axes milling machine generally requires a milling block to be turned during milling operations in order to manufacture a 3D part. The milling block thus faces the milling tool in multiple directions during the manufacture process. A milling direction in the designed part may be determined for each direction taken by the milling block during machining operations. For example, if milling operations on a cube of material comprise reproducing three through holes on three different faces of the cube, then the cube is turned three times so ensuring that each one of the three faces is in front of the milling tool.

The preferred embodiment of the present invention has been described. It will be understood that various modifications may be made without departing from the spirit and scope of the invention. Therefore, other implementations are within the scope of the following claims. For instance, the invention may be used with any machine which removes material to one direction, e.g a drill, plasma cutting, water jet cutting, laser cutting. . . .

The invention claimed is:

1. A computer-implemented method for designing a part manufacturable by milling operations comprising:
   obtaining a topologically optimized three-dimensional (3D) modeled part;
   computing a bounding volume encompassing the topologically optimized 3D modeled part;
   defining a milling direction of a milling tool;
   computing a silhouette of the topologically optimized 3D modeled part according to the milling direction, the silhouette comprising a contour; and
   computing a new contour based on a parameter of the milling tool.

2. The computer-implemented method of claim 1, wherein computing the silhouette further comprises:
   identifying on the silhouette one or more contours, wherein a contour separates a surface representing a volume occupied by the topologically optimized 3D modeled part and a surface representing an empty volume in the topologically optimized 3D modeled part.

3. The computer-implemented method of claim 1, wherein the parameter of the milling tool is a diameter of the milling tool.

4. The computer-implemented method of claim 3, wherein computing the silhouette further comprises:
   identifying on the silhouette one or more contours, wherein a contour separates a surface representing a volume occupied by the topologically optimized 3D modeled part and a surface representing an empty volume in the topologically optimized 3D modeled part, and
   wherein computing a new contour comprises:
   computing the set of positions of a circle with a diameter equal to that of the milling tool, the circle being only on the surface of the contour representing an empty volume, for which there is at least one contact point between the circle and the contour and for which no point of the circle is outside the contour.

5. The computer-implemented method of claim 4, wherein computing a new contour further comprises:
   determining in the set of positions, one or more positions of the circle corresponding to an uninterrupted displacement of the circle along the contour;
   with the set of contacts between the contour and the circle in each of the one or more positions determined in the set of positions, computing one or more lines.

6. The computer-implemented method of claim 5, wherein computing a new contour further comprises:
   identifying the endpoints of the computed one or more lines; and
   connecting two endpoints with an arc of the circle in contact with the two endpoints, the circle being in one of the one or more positions determined in the set of positions.

7. The computer-implemented method of claim 2, wherein computing a new contour further comprises:
   computing a polyline following the contour, the polyline being at a maximum distance from the contour determined from a user input and, the polyline being in the surface representing an empty volume; and
   rounding the convex angles of the segments of the polyline with a curvature equal to that of the circle with a diameter equal to that of the milling tool.

8. The computer-implemented method of claim 1, wherein defining a milling direction of a milling tool comprises:
   obtaining a design space from which the topologically optimized 3D object is computed; and
   identifying on the design space a direction involved by a design intent, the milling direction being the identified direction involved by a design intent.

9. The computer implemented method of claim 2, wherein identifying on the silhouette one or more contours comprises:
   performing a tessellation of the topologically optimized 3D modeled part, a tile size being limited by the parameter of the milling tool;
   projecting the points of the tessellated topologically optimized 3D modeled part on a grid of cells on a plane along the milling direction of the milling tool, a grid cell size being limited by the parameter of the milling tool; and
   identifying a first group of cells of the grid, the first group of cells each having at least one projected point and having as a neighbor at least one cell with no projected points, the projected points belonging to the cells of the first group defining one or more contours.

10. The computer implemented method of claim 9, wherein determining whether the surface delimited by one or more contours represents a volume occupied by the topologically optimized 3D modeled part or a represents an empty volume comprises:
    identifying a second group of cells of the grid, the second group of cells each having at least one projected point and having neighbor cells with at least one projected point each, at least one of the neighbor cells belonging to the first group of cells;
    determining each surface delimited by one or more contours and comprising at least one cell of the second group as a surface representing a volume occupied by the topologically optimized 3D modeled part; and
    determining each surface delimited by one or more contours and comprising no cell of the second group as a surface representing an empty volume.

11. The computer implemented method of claim 1, wherein the bounding volume encompassing the topologically optimized 3D modeled part is oriented using one of:
    a user selection of the orientation of the bounding volume,
    an axis system of the topologically optimized 3D modeled part,
    a global axis system of a 3D scene wherein the topologically optimized 3D modeled part is located, or
    a physical property of the topologically optimized 3D modeled part computed from an inertia matrix of the topologically optimized 3D modeled part.

12. The computer-implemented method of claim 1, further comprising:
    computing a 3D volume from the silhouette having the new contour.

13. The computer-implemented method of claim 12, comprising:

selecting one or more further milling directions;

for each further milling direction, computing a silhouette with a respective new contour; and computing the 3D volume from each silhouette computed for each further milling direction.

14. A non-transitory computer readable medium having stored thereon a computer program comprising instructions to perform the method of claim 1.

15. A system comprising:

a processor coupled to a memory storing a computer program that when executed by the processor causes the processor to be configured to:

obtain a topologically optimized three-dimensional (3D) modeled part, compute a bounding volume encompassing the topologically optimized 3D modeled part, define a milling direction of a milling tool, compute a silhouette of the topologically optimized 3D modeled part according to the milling direction, the silhouette comprising a contour, and compute a new contour based on a parameter of the milling tool.

16. A method for manufacturing a part by milling operations, comprising:

obtaining, by a milling machine, a designed part designed according to the method of claim 1; and manufacturing, by the milling machine, the designed part.

* * * * *